United States Patent [19]
Pittman

[11] Patent Number: 5,071,511
[45] Date of Patent: * Dec. 10, 1991

[54] ACOUSTICAL MINERAL FIBERBOARD

[75] Inventor: William D. Pittman, Ruskin, Fla.

[73] Assignee: The Celotex Corporation, Tampa, Fla.

[*] Notice: The portion of the term of this patent subsequent to Mar. 27, 2007 has been disclaimed.

[21] Appl. No.: 483,707

[22] Filed: Feb. 23, 1990

Related U.S. Application Data

[62] Division of Ser. No. 210,472, Jun. 23, 1988, abandoned.

[51] Int. Cl.$^5$ ............................................. D21H 5/18
[52] U.S. Cl. .................................. 162/145; 162/204; 162/222; 162/225; 162/181.7; 181/294; 252/62; 264/119
[58] Field of Search .................. 252/62; 181/294; 162/181.7, 145, 206, 222, 225, 204; 264/119

[56] References Cited

U.S. PATENT DOCUMENTS

| | | | |
|---|---|---|---|
| 2,773,764 | 12/1956 | Park | 92/3 |
| 3,042,578 | 7/1962 | Denning | 162/181.7 |
| 3,093,533 | 6/1963 | Hella et al. | 162/145 |
| 3,243,340 | 3/1966 | Cadotte | 162/135 |
| 3,250,633 | 5/1966 | Cotts | 106/214 |
| 3,297,517 | 2/1967 | Cadotte | 162/145 |
| 3,348,996 | 10/1967 | Cadotte | 162/114 |
| 3,379,608 | 5/1968 | Roberts et al. | 162/145 |
| 4,024,014 | 5/1977 | Akerson | 162/145 |
| 4,072,558 | 3/1978 | Akerson | 162/145 |
| 4,153,503 | 6/1979 | Booth et al. | 162/123 |
| 4,249,991 | 2/1981 | Baes et al. | 162/152 |
| 4,263,093 | 4/1981 | Shenk | 162/109 |
| 4,613,627 | 9/1986 | Sherman et al. | 521/68 |
| 4,698,257 | 10/1987 | Goll | 428/227 |
| 4,911,788 | 3/1990 | Pittman | 162/194 |

Primary Examiner—Richard V. Fisher
Assistant Examiner—Todd J. Burns
Attorney, Agent, or Firm—Charles W. Vanecek

[57] ABSTRACT

A rigid, self-supporting, acoustical mineral fiberboard comprising a mixture of about 50 to 70 weight percent of mineral fibers, 15 to 35 weight percent of perlite, 1 to 10 weight percent of cellulosic fibers, and 4 to 15 weight persent of a binder with the proviso that the board forming solids do not include any clay filler. A pattern is formed on the fiberboard after the fiberboard has been dried.

22 Claims, 3 Drawing Sheets

ACOUSTICAL MINERAL FIBERBOARD

This is a division of application Ser. No. 210,472, filed June 23, 1988, now abandoned.

BACKGROUND OF THE INVENTION

1. Field of the Invention

This invention relates to a mineral fiberboard, and, more particularly, a mineral fiber acoustical board or unit.

2. Description of the Prior Art

Mineral fiberboards (e.g., acoustical panels) are of commercial value, compared to vegetable fiberboards, because of the incombustibility of the mineral fiber. The acoustical panels are conventionally made with mineral wool fibers and a starch binder. It is customary to impart a desired acoustical rating to these panels by mechanically punching or fissuring them. While, in many conventional ceiling products, the board perforations are necessary for sound absorption and are sometimes decorative, there are certain instances where the perforations detract from the appearance. In these instances, it would be desirable to utilize a ceiling panel which is not perforated but still has high sound-absorption properties.

OBJECTS OF THE INVENTION

It is therefore an object of the present invention to provide an improved mineral fiber containing composition from which a highly sound-absorptive ceiling panel can be produced without any need to mechanically punch or fissure the panel.

It is another object of the present invention to provide an improved mineral fiber-containing board which is characterized by a combination of desirable physical properties, including good strength and sound-absorption properties and a highly decorative surface.

Other objects and advantages of the present invention will become apparent to those skilled in the art when the instant disclosure is read in conjunction with the accompanying drawings.

SUMMARY OF THE INVENTION

The above objects have been achieved in the mineral fiberboard of the present invention, which comprises sufficient mineral materials to render the board highly sound-absorbing without the need for mechanical punching or fissuring. The preferred mineral materials are mineral fibers, e.g., mineral wool, and perlite, but other mineral fillers can also be used. However, clay is not included in the board and its omission, together with the use of a relatively small amount of cellulosic material, e.g., newsprint, results in the attainment of a particularly high noise reduction coefficient (NRC). The board advantageously comprises mineral wool, Perlite, cellulosic fibers and binder in suitable proportions to give a high NRC without the need for a multiplicity of holes from the surface to the interior of the board.

While any conventional method for making an acoustical mineral fiberboard may be employed, the high sound-absorbing board of the present invention is preferably made by conventional wet processes wherein a water slurry of mineral fibers and a binder such as starch is deposited continuously upon a moving wire screen and the water is removed by drainage and suction. The mat thus formed is dried and the binder set, after which the mat is cut into units of desired dimensions for installation. In order to improve appearance and further enhance sound-absorption properties, the product can be fissured or punched to provide a perforated surface.

In an advantageous embodiment of the invention, the fiberboard is produced from a slurry containing mineral fibers which are nodulated during wet mixing of the slurry's ingredients. The ingredients, together with the water necessary to make up the required high slurry consistency (e.g., greater than 5%) for extensive mineral fiber nodulation, are added to conventional mixing and holding equipment from which they are flowed onto the board-forming wire of a machine such as a Fourdrinier through a conventional head box. The water-laid mat which is thus formed is compressed and dried. The resulting dried board surface is then advantageously modified to yield a finished product having a combination of desirable properties, including a visually appealing surface. The surface modification may include abrasion, such as by surface brushing or surface blasting (e.g., by a centrifugal force blasting machine), or any other treatment which results in a decorative appearance.

DESCRIPTION OF THE DRAWINGS

The invention will now be described with reference to the accompanying drawings in which.

DETAILED DESCRIPTION OF THE INVENTION

Figure 1:
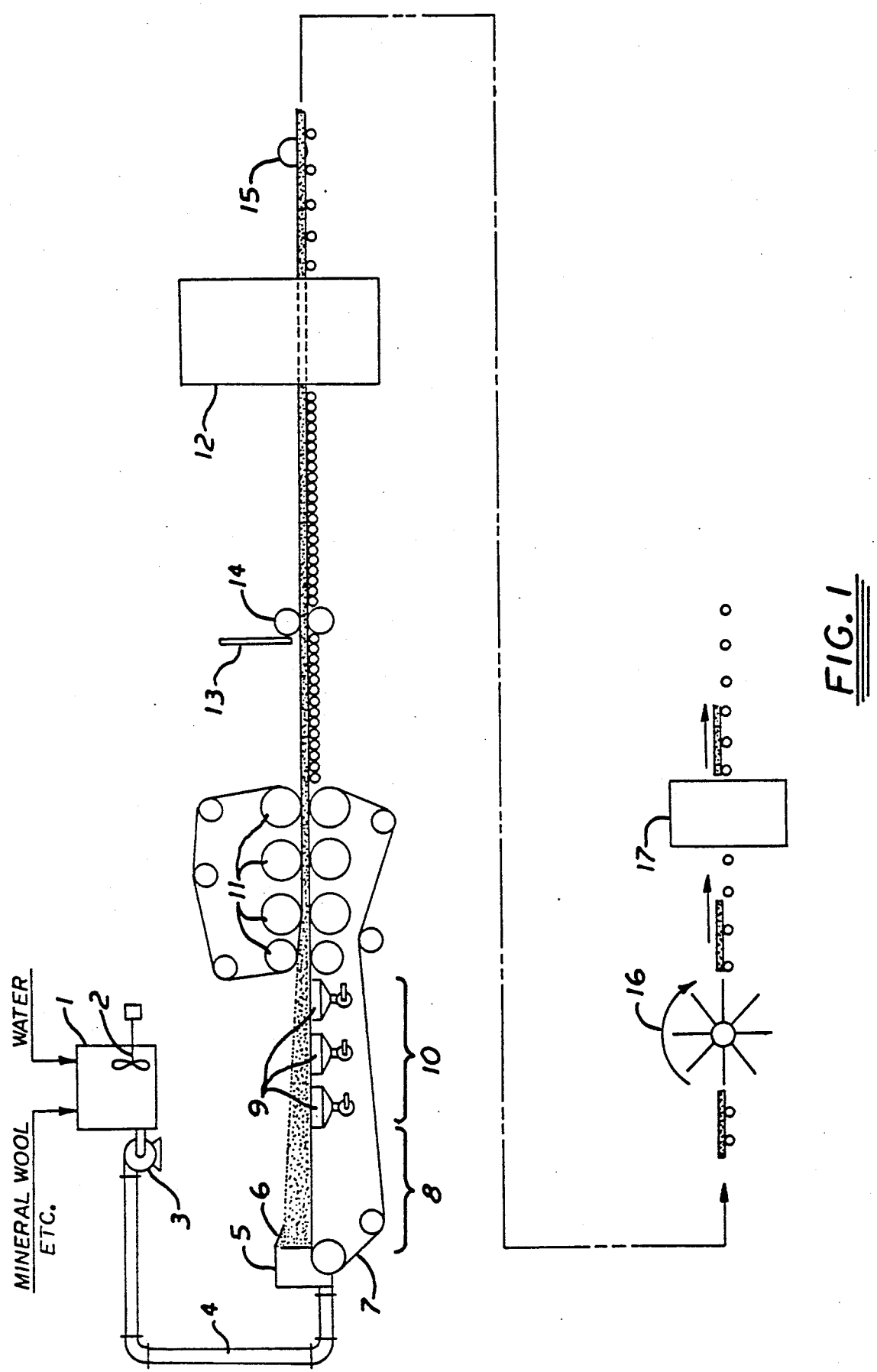
FIG. 1 is a diagrammatic, side elevational view of a fiberboard forming process in accordance with the present invention.

The sound absorption properties of a mineral fiberboard made from mineral wool or the like with a binder are greatly enhanced by utilizing in the board-forming composition a specific quantity of perlite, and no more than about 10% by weight (dry solids basis) of cellulosic material, and by excluding clay from the composition. The quantities of materials employed have been found to be critical for the attainment of a high noise reduction coefficient in conjunction with the other properties required in a commercially acceptable acoustical board, such as sag and fire resistance, and adequate strength for large panel sizes. The following table sets forth the amounts of solid materials in terms of percent by weight on a dry basis of the preferred formulation used in the formation of the acoustical panel of the present invention.

| Ingredient | Typical (%) | Range (%) | Preferred Range (%) |
| --- | --- | --- | --- |
| Mineral Wool | 65.0 | 50–70 | 64–66 |
| Perlite | 25.5 | 15–35 | 21–28 |
| Cellulosic Fibers | 3.0 | 1–10 | 2–5 |
| Starch | 6.5 | 4–15 | 4–10 |
| Retention Aid | 0.03 | 0–1 | 0–0.1 |

The mineral fiber component of the acoustical board of the invention includes wool or fibers formed from rock, slag, fused glass, glass mixtures thereof and other heat liquefiable raw materials capable of being converted into fibers. The mineral fibers usually have a ratio of length to diameter which is equal to 10 or higher, with lengths which vary between 0.1 and 100 mm, more typically between 1 and 10 mm, and diameters within the range of 0.1 to 25 microns. The mineral wool employed in the process of the invention typically has fiber diameters from about 4 to 8 microns, an acid/base ratio (molar) of about 0.80 to 1.10 and the following composition:

| Mineral Wool Composition | | |
|---|---|---|
| | Typical (%) | Range (%) |
| $SiO_2$ | 45 | 42–48 |
| $Al_2O_3$ | 8 | 7–9 |
| CaO | 37 | 36–38 |
| MgO | 7 | 6–9 |

The slurry also may contain cellulosic fibers and a binder. The solids of the slurry may comprise about 50% to 5% mineral fibers and about 1% to 10%, preferably 1% to 8%, cellulosic fibers, and the binding agent in an amount sufficient to form the board of the invention, as, e.g., about 5% to 15%.

The cellulosic fibers may be wood fibers, primary or secondary paper fibers, cotton linters or the like. The fiber length will generally be up to about ¼ inch in length. Highly desirable fibers for use in the present invention are newsprint fibers which will generally have a length of from about ¼ millimeter to about 5 millimeters with an average length of about 1 millimeter.

Numerous materials may be used as binding agents in the board-forming composition of the invention. Useful binders include starch, chemically modified starches, phenol-formaldehyde or other artificial resin binders, sodium silicate, glue, casein, rubber latex, aqueous rubber dispersions or emulsions, asphalt emulsions, or combinations thereof. The binder may include a minor amount of virgin kraft pulp, as disclosed in U.S. Pat. No. 2,773,764.

A wide variety of fillers can be employed in the mineral fiber containing composition of the invention. The preferred fillers are those which are inorganic. It is desirable to avoid mineral fillers which are too fine such as those having an average particle size of less than 5 microns.

Advantageously, the composition contains about 15 to 35, preferably 21 to 28, and more preferably 23 to 26, wt % (dry solids basis) of expanded perlite particles, which suitably have a density in the range from about 3.0 to 8.0, preferably 5.0–8.0, pcf. The expanded perlite used in the present invention has a typical screen analysis as follows:

| Expanded Perlite Typical Sieve Analysis | | |
|---|---|---|
| | % Retained | |
| U. S. Sieve No. | Typical | Range |
| 8 | 0 | 0 |
| 16 | 0 | 0-2 |
| 30 | 8 | 4–20 |
| 50 | 55 | 35–60 |
| 100 | 27 | 15–40 |
| pan | 10 | 10–20 |

The composition additionally may contain other auxiliary substances useful in conventional mineral fiberboard-forming compositions, such as preservatives, wetting agents, defoamers, retention aids, sizing agents, and broke. The amounts of such auxiliary additives can be readily determined by those skilled in the art.

In the preferred wet process for making the mineral fiberboard, the solid materials, including mineral wool, perlite, starch, and cellulosic fibers, are slurried and commingled with water in a suitable container 1 provided with agitation means 2. The mineral wool-containing slurry can have a consistency or solids content of from about 2–8 wt %. Advantageously, the consistency is sufficiently high (e.g., 5–8 wt %) to bring about substantial formation of nodulated wool upon mixing of the slurry. The formation of nodules of mineral fiber during mixing of the slurry is brought about as described in U.S. patent application Ser. No. 210,446 of William D. Pittman, Alan Boyd, and Fred L. Migliorini, entitled: "Method of Wet-Forming Mineral Fiberboard with Formation of Fiber Nodules" and filed on the same date as the present application. Alternatively, the mineral wool may be introduced to the slurry in the form of pellets of previously nodulated mineral wool.

After the mineral wool containing slurry is agitated sufficiently to uniformly distribute the solids and, when appropriate, to nodulate the wool, the slurried composition is transferred by pump 3 through pipe 4 to head box 5. The slurry is subsequently deposited on Fourdrinier wire 7 through orifice 6 of head box 5. The first section 8 of the Fourdrinier wire permits free drainage of water from the material and further drainage is promoted by suction boxes 9 in section 10. As the slurry is brought in contact with the Fourdrinier machine and water of the slurry drains therefrom, a wet felted mat of the mineral fiber composition forms on the machine. The wet laid mat is dewatered by the Fourdrinier machine to a solids content of about 20 to 40 weight percent.

The partially dried material is then prepressed to a thickness of about 0.4 to 0.8 inch by a plurality of press rolls 11. It will be appreciated that a single set of press rolls could be employed if desired. After being pressed, the sheet product will generally have from about 60 to about 75% water. A coating may be applied to the pressed mat by means of feed-pipe 13 and coater 14.

After passing through press rolls 11, the wet mat is transferred into dryer 12. At the outlet of the dryer, there is obtained a board having a moisture content of less than about 1.0%. The board is cut into smaller panels by saw arrangement 15. The dried product can be subjected to any suitable conventional finishing apparatus, depending on the applications for which it is intended. Such apparatuses may include applicators for applying coatings to protect and/or decorate the product surface, such as bevel coaters, finish spray coaters, printers, multi-color decorative coaters, and the like, and further drying equipment.

A fine-textured appearance can be created on one of the two major surfaces of the dried board by any suitable texturing means 17, such as by abrading, scoring, brushing, etc. The board may be advantageously turned over by an inverter 16 to present the smooth screen side for surface treatment. It has been found that a wheel blaster, such as that supplied by Wheelabrator-Frye, Inc., and known as a Tile Etch Machine, produces a surface which is fine-textured and visually appealing.

The wheel blaster uses centrifugal force to propel abrasive material against the board surface. Suitable abrasive material for eroding the surface includes metal grit, plastic abrasive, and walnut shells. Typically, the surface abrasion removes only about 0.01–0.04 inch of the board surface in producing the desired look. The finish coat is suitably applied to the board after its treatment by the blasting machine.

In accordance with the process of the present invention, the mineral fiber-containing slurry is typically formed into a textured fiberboard of from about 0.4 to 0.8 inch thick, preferably from about 0.5 to 0.8 inch thick, and having a density of from about 10 to 25 pounds per cubic foot, preferably from about 10 to 20 pounds per cubic foot. The noise reduction coefficient (NRC) of the board is generally from about 0.50–0.70, and preferably greater than 0.55, and can be secured without the use of mechanical punching or fissuring, although, if desired, the latter means can be employed to further enhance the NRC.

ing wet mat was pressed to the thickness and density shown in Table 1 and dried. Measurement of the porosity of the boards gave the air flow resistivity results presented in Table 1. In this type of comparative study of fiberboards prepared from similar ingredients, the measured air flow resistivity is found to provide a reasonable estimation of the board's noise reduction coefficient (NRC), with the air flow resistivity and NRC being inversely related.

Figure 2:
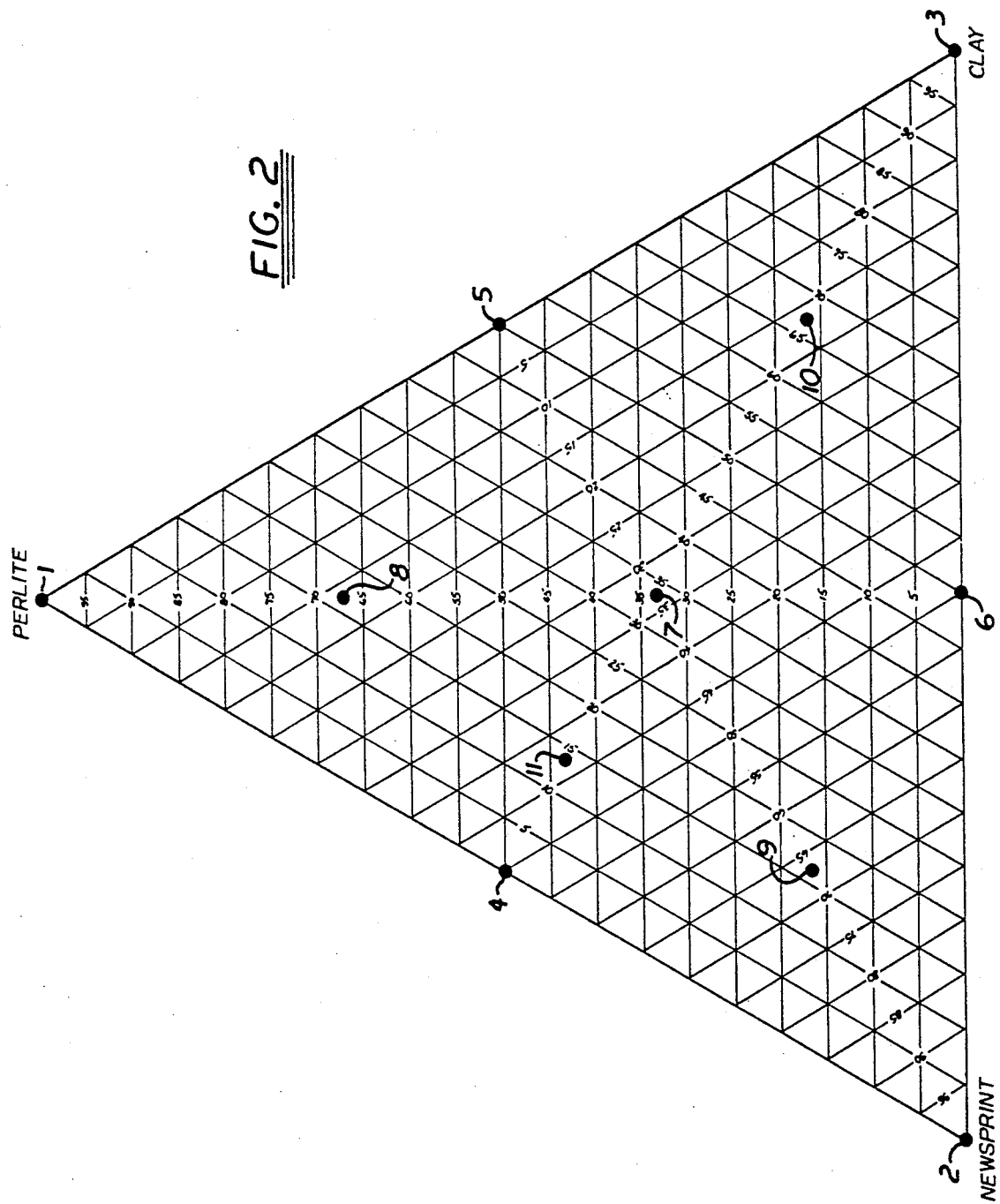
FIG. 2 is a triangular graph showing the relative percentages of perlite, newsprint and clay in a series of mineral fiberboards—mineral wool and starch concentrations held constant.

The effect on NRC of varying the content of the perlite, newsprint and clay ingredients while keeping the mineral wool and binder constant may be seen from Table 1 considered in connection with FIG. 2 of the drawings which is a triangular graph showing for each of fiberboards 1 to 11 the percentages of the three varied ingredients vis-a-vis one another. As clearly seen from the table and graph, the lowest air flow resistivities and hence highest NRCs are attained when no clay is included in the board-forming composition (boards 1 and 4). Additionally, it is seen that board 1, having a greater content of perlite than board 4, has a lower air flow resistivity (higher NRC) than the latter board. The import of the testing is that mineral fiberboards prepared without clay and with relatively high perlite and low newsprint contents are preferred acoustical products.

TABLE 1

| Board No. | Percent by Weight[1] | | | Thickness (in) | Density (lb/ft[3]) | Air Flow Resistivity[2] (MKS rayls/M) |
|---|---|---|---|---|---|---|
| | Perlite | Newsprint | Clay | | | |
| 1 | 35.5 | 0 | 0 | 0.569 | 16.6 | 931,025 |
| 2 | 0 | 35.5 | 0 | 0.385 | 26.0 | 8,255,894 |
| 3 | 0 | 0 | 35.5 | 0.512 | 23.1 | 13,347,297 |
| 4 | 17.75 | 17.75 | 0 | 0.536 | 19.4 | 1,764,658 |
| 5 | 17.75 | 0 | 17.75 | 0.587 | 20.1 | 5,232,331 |
| 6 | 0 | 17.75 | 17.75 | 0.466 | 25.6 | 18,331,052 |
| 7 | 11.8 | 11.8 | 11.8 | 0.547 | 21.7 | 7,458,666 |
| 8 | 23.7 | 5.9 | 5.9 | 0.595 | 19.4 | 2,734,620 |
| 9 | 5.9 | 23.7 | 5.9 | 0.503 | 23.5 | 4,985,731 |
| 10 | 5.9 | 5.9 | 23.7 | 0.531 | 21.7 | 12,256,867 |
| 11 | 15.2 | 15.2 | 5.1 | 0.580 | 18.1 | 1,771,880 |

[1]Of total board-forming composition.
[2]According to ASTM C522.

The present invention is further illustrated by the following examples in which all percentages are on a dry weight basis.

EXAMPLE 1

Mineral wool fiberboards 1 to 11 were each prepared from a slurry consisting of approximately 551.0 g solids uniformly dispersed in 2.0 gal water, with the concentrations of the mineral wool and a gelatinized starch binder being held constant at 55% and 9.5%, respectively, and the concentrations of the remaining ingredients being adjusted as shown in Table 1 below. The minor amount of retention aid (0.08%) employed in preparing each board is not shown in the table.

The ingredients were diluted with water and mixed to form a homogeneous slurry. The water was drained away by pouring the slurry on a screen, and the result-

EXAMPLE 2

The board-forming procedure of Example 1 was repeated for mineral fiberboards 12 to 22 of Table 2 below, except for the omission of clay and use of the mineral wool, perlite and newsprint ingredients at the levels shown in the table. The gelatinized starch binder was again held constant at 9.5%.

Figure 3:
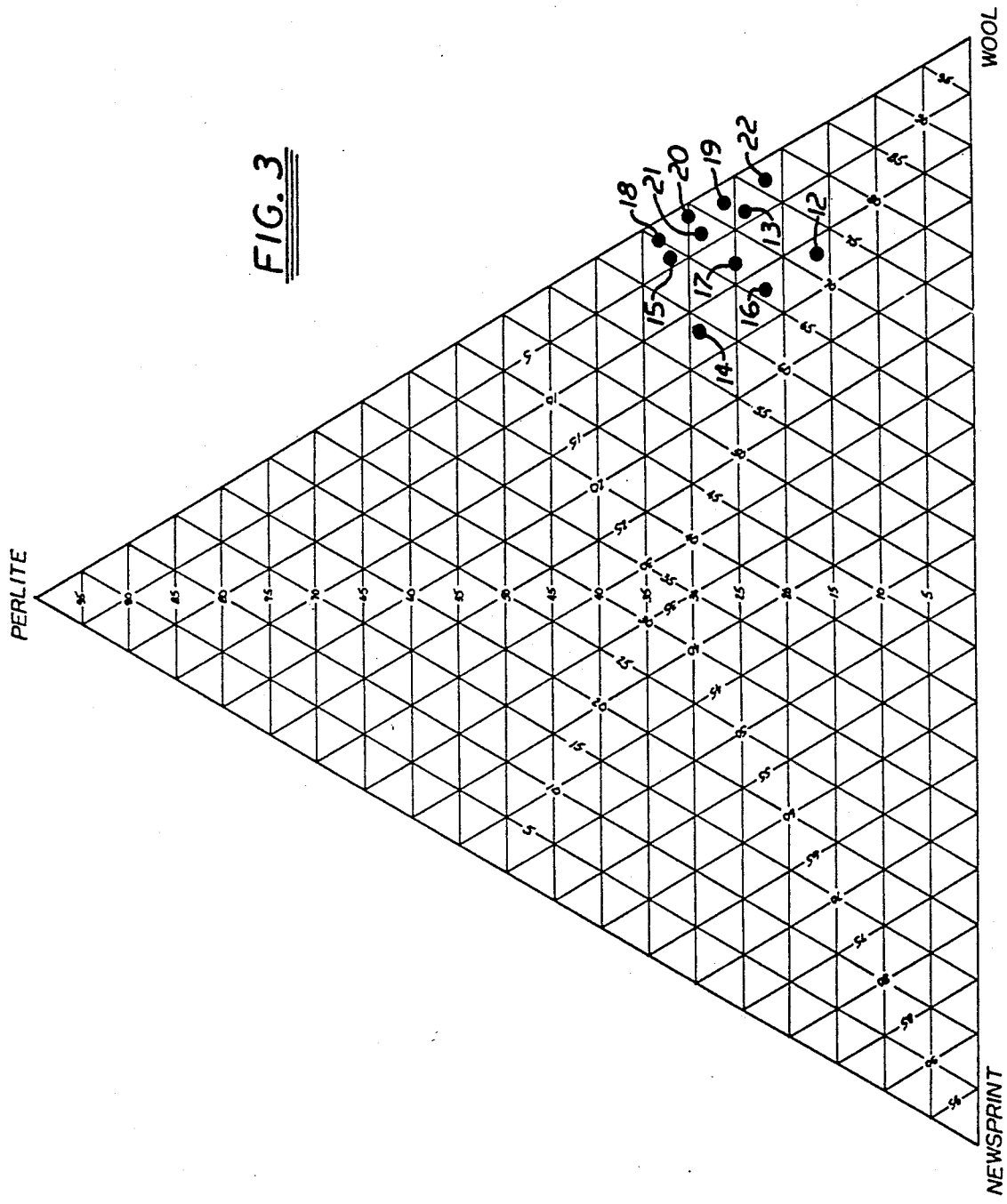
FIG. 3 is a triangular graph showing the relative percentages of perlite, newsprint and mineral wool in another series of mineral fiberboards starch concentration held constant and clay omitted.

The relative percentages of perlite, newsprint and mineral wool—the total quantity of these 3 ingredients being taken as 100% for purposes of the graph—are shown in FIG. 3 of the drawings for each of boards 12 to 22. Consideration of Table 2 in connection with FIG. 3 clearly shows that boards made with a newsprint content of less than 5 weight % constitute superior acoustical products.

TABLE 2

| Board No. | Percent by Weight[1] | | | Thickness (in) | Density (lb/ft[3]) | Air Flow Resistivity[2] (MKS rayls/M) |
|---|---|---|---|---|---|---|
| | Mineral Wool | Perlite | Newsprint | | | |
| 12 | 65.0 | 14.5 | 11.0 | 0.644 | 16.3 | 1,144,099 |
| 13 | 65.0 | 21.5 | 4.0 | 0.644 | 14.5 | 504,038 |
| 14 | 55.0 | 24.5 | 11.0 | 0.664 | 16.0 | 1,367,693 |
| 15 | 58.5 | 28.0 | 4.0 | 0.643 | 15.6 | 655,065 |
| 16 | 60.0 | 19.5 | 11.0 | 0.673 | 16.2 | 1,285,349 |

TABLE 2-continued

| Board No. | Percent by Weight[1] | | | Thickness (in) | Density (lb/ft[3]) | Air Flow Resistivity[2] (MKS rayls/M) |
|---|---|---|---|---|---|---|
| | Mineral Wool | Perlite | Newsprint | | | |
| 17 | 60.9 | 22.1 | 7.5 | 0.686 | 15.5 | 957,868 |
| 18 | 57.7 | 29.0 | 1.8 | 0.642 | 14.6 | 493,948 |
| 19 | 65.0 | 23.7 | 1.8 | 0.644 | 15.0 | 473,728 |
| 20 | 62.9 | 26.7 | 0.9 | 0.653 | 14.3 | 347,107 |
| 21 | 62.0 | 25.8 | 2.7 | 0.651 | 15.3 | 510,823 |
| 22 | 69.2 | 18.6 | 2.7 | 0.689 | 14.6 | 460,253 |

[1] Of total board forming composition.
[2] According to ASTM C522.

EXAMPLE 3

This example illustrates, with reference to FIG. 1 of the drawings, the large-scale production of a wet-felted ceiling product of the present invention.

The formulation utilized in manufacturing the product consisted of the following ingredients in the listed percentages by weight:

| Ingredient | % |
|---|---|
| Mineral Wool | 67.0 |
| Perlite | 22.7 |
| Newsprint | 8.4 |
| Starch | 7.3 |
| Retention Aid | 0.05 |

The ingredients were diluted with water to form a slurry in machine chest 1. Wet mixing of the slurry, which had a stock consistency of 5.5 wt %, nodulated the mineral wool. The slurry was transferred to head box 5 and next deposited on Fourdrinier wire 7. The slurry was dewatered in a conventional manner on the Fourdrinier machine to form a wet felt or mat of interlocked fibers. The partially dewatered fibrous mat was next passed through a press section comprising pressing rolls 11, which densified the mat and provided a wet mat of uniform thickness (about one inch) with a moisture content of about 65%. After leaving the press section, the wet mat was conveyed to dryer 12.

After being dried, the board product was subjected to various conventional finishing steps, which included cutting into appropriate sizes and cleaning. After being flipped over by inverter 16, the board product was then abraded on the screen side by a wheel blaster, and this side was coated to produce textured fiberboards of the invention.

The process was repeated except that feed-pipe 13 and coater 14 were employed to coat the mat and thus provide, after the coated mat was turned upside down by inverter 16, a backsizing on the finished fiberboards.

Backsized and unbacksized mineral ceiling panels made in accordance with the foregoing procedures had the physical characteristics reported in the following Table 3:

TABLE 3

| Evaluation of Fiberboards | |
|---|---|
| Physical Property | Value |
| ASTM E-84 Tunnel Test Rating | Class I with a 20 Flame Spread and 10 Smoke Developed |
| Average Thickness, in | 0.739 |
| Average Density, lb/cu ft | 13.3 |
| Transverse Strength, backsized, lb | 26.9 |
| Transverse Strength, unbacksized, lb | 19.0 |
| NRC | |

TABLE 3-continued

| Evaluation of Fiberboards | |
|---|---|
| Physical Property | Value |
| 2' × 2' backsized | 50 |
| 2' × 2' unbacksized | 50 |
| 2' × 4' backsized | 55 |
| 2' × 4' unbacksized | 50 |

I claim:

1. In a method of manufacturing an acoustical mineral fiberboard by continuously dewatering an aqueous slurry of board-forming solids to obtain a wet felt, drying the wet felt and creating a fine-textured appearance on a major surface of the dried felt, the improvement wherein the board-forming solids comprise a mixture of about 50 to 70 weight percent of mineral fibers, 15 to 35 weight percent of perlite, 1 to 10 weight percent of cellulosic fibers, and 4 to 15 weight percent of a binder, with the proviso that the board-forming solids do not include any clay filler.

2. The method of claim 1 wherein the mineral fibers comprise mineral wool.

3. The method of claim 1 wherein the binder comprises starch.

4. The method of claim 1 wherein the board-forming solids comprise a mixture of about 64 to 66 weight percent of mineral wool, 21 to 28 weight percent of perlite, 2 to 5 weight percent of cellulosic fibers, and 4 to 10 weight percent of starch.

5. The method of claim 1 wherein the step of creating a fine-textured appearance comprises abrading the surface of the dried felt.

6. The method of claim 5 wherein the board-forming solids comprise a mixture of about 64 to 66 weight percent of mineral wool, 21 to 28 weight percent of perlite, 2 to 5 weight percent of cellulosic fibers and 4 to 10 weight percent of starch.

7. The method of claim 5 wherein the surface is abraded by a wheel blaster which uses centrifugal force to propel abrasive material against the surface.

8. The method of claim 7 wherein the abrasive material is walnut shells.

9. The method of claim 5 wherein the abraded surface is fissured or punched.

10. The method of claim 1 wherein the surface of the dried felt is fissured or punched.

11. The method of claim 1 wherein the surface of the dried felt is fissured.

12. The method of claim 11 wherein the surface is additionally punched.

13. A method of manufacturing an acoustical mineral fiberboard comprising
(a) forming an aqueous slurry of board-forming solids, the solids comprising a mixture of about 50 to 70 weight percent of mineral fibers, 15 to 35 weight percent of perlite, 1 to 10 weight percent of cellulosic fibers, and 4 to 15 weight percent of a binder;

(b) depositing the slurry on a moving wire screen to form a partially dewatered wet felt;

(c) compressing the partially dewatered wet felt to further remove water therefrom;

(d) drying the wet felt; and (e) forming a decorative pattern on a major surface of the dried felt, with the proviso that the board-forming solids do not include any clay filler.

14. The method of claim 13 wherein the mineral fibers comprise mineral wool.

15. The method of claim 13 wherein the binder comprises starch.

16. The method of claim 13 wherein the solids of the slurry comprise a mixture of about 64 to 66 weight percent of mineral wool, 21 to 28 weight percent of perlite, 2 to 5 weight percent of cellulosic fibers, and 4 to 10 weight percent of starch.

17. The method of claim 16 wherein the decorative pattern is formed by abrasion by a wheel blaster which uses centrifugal force to propel abrasive material against the surface.

18. The method of claim 17 wherein the abrasive material is walnut shells.

19. The method of claim 13 wherein the felt surface which did not contact the wire screen during dewatering is coated after step (c) and before step (d).

20. The method of claim 19 wherein the surface with the decorative pattern is fissured or punched.

21. An acoustical mineral fiberboard made by the method of claim 1 comprising:

a fine textured appearance on the major surface of the dried felt which forms the fiberboard, and wherein the board forming solids comprise a mixture of about 50 to 70 weight percent of mineral fibers, 15 to 35 weight percent of perlite, 1 to 10 weight percent of cellulosic fibers, and 4 to 15 weight percent of a binder, with the proviso that the board-forming solids do not include any clay filler.

22. An acoustical mineral fiberboard made by the method of claim 13 comprising:

a decorative pattern on the major surface of the dried felt which forms the fiberboard, and wherein the board forming solids comprise a mixture of about 50 to 70 weight percent of mineral fibers, 15 to 35 weight percent of perlite, 1 to 10 weight percent of cellulosic fibers, and 4 to 15 weight percent of a binder, with the proviso that the board-forming solids do not include any clay filler.

* * * * *